P. N. JONES, F. R. PHILLIPS & J. W. WELSH.
PASSENGER CAR.
APPLICATION FILED JULY 8, 1912.
1,150,680.
Patented Aug. 17, 1915.
4 SHEETS—SHEET 1.
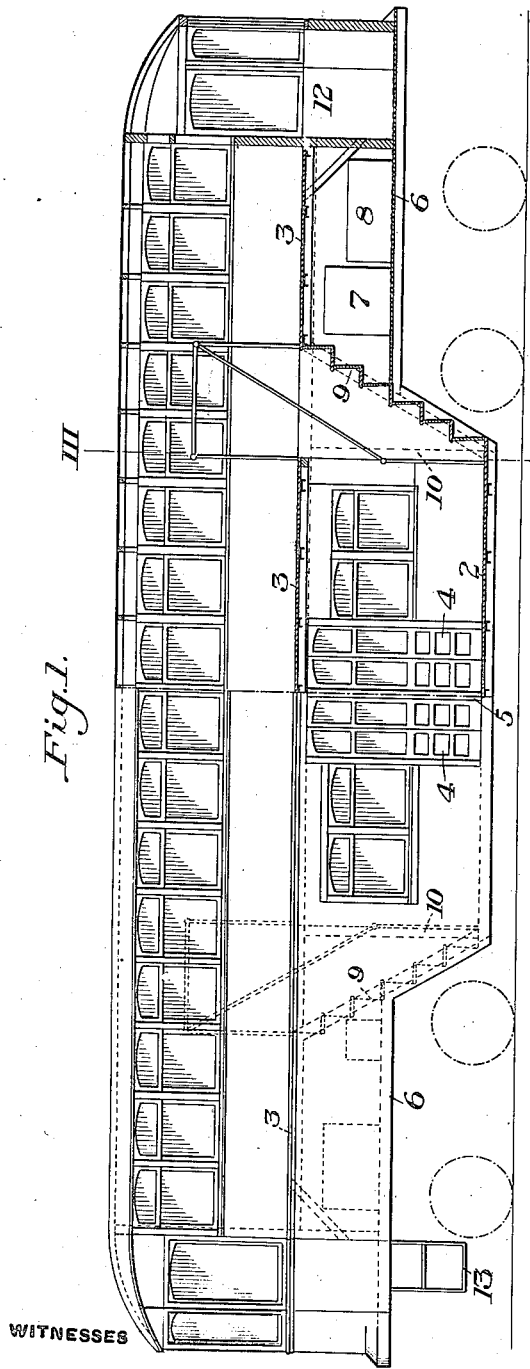
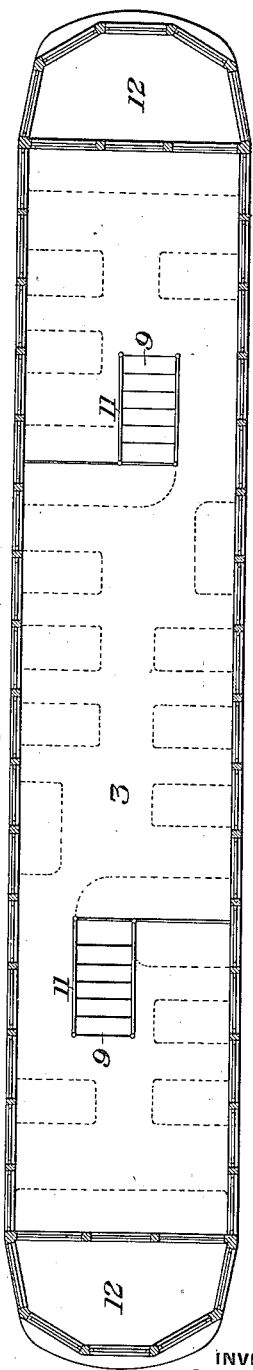
WITNESSES
R A Balderson
D. B. Fleming
INVENTORS
P. N. Jones
F. R. Phillips
J. W. Welsh
by Bakewell, Byrnes & Parmelee
Attys

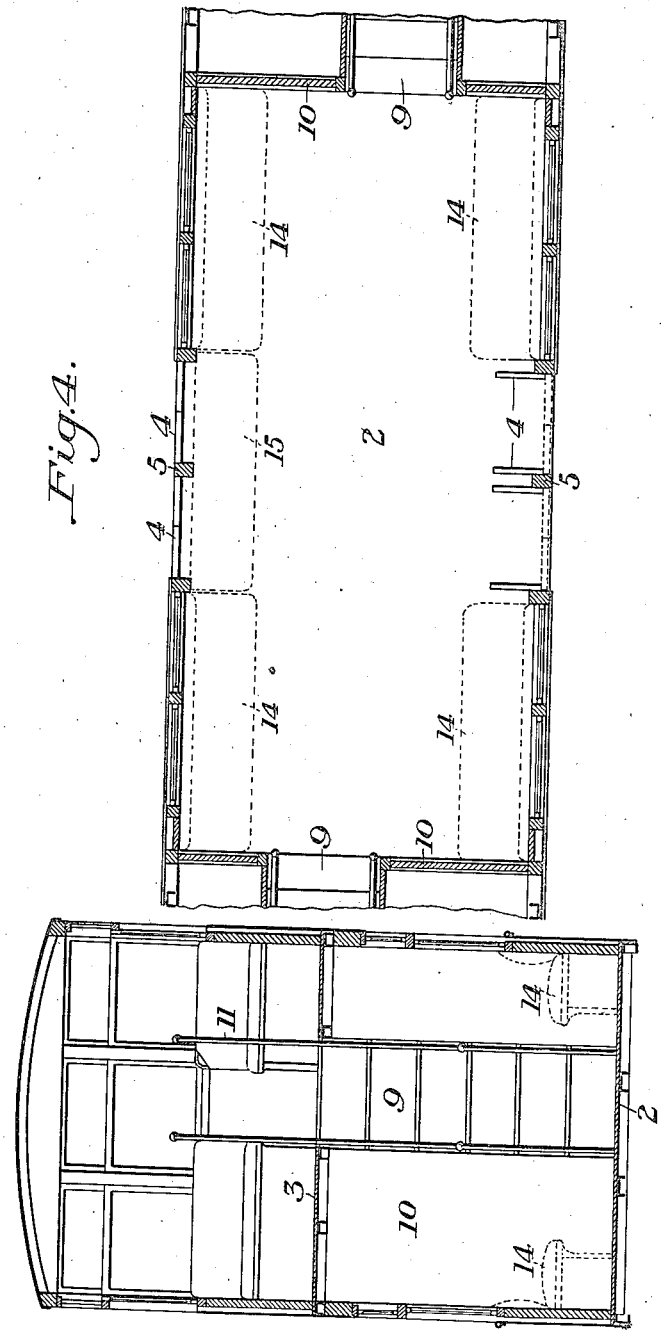

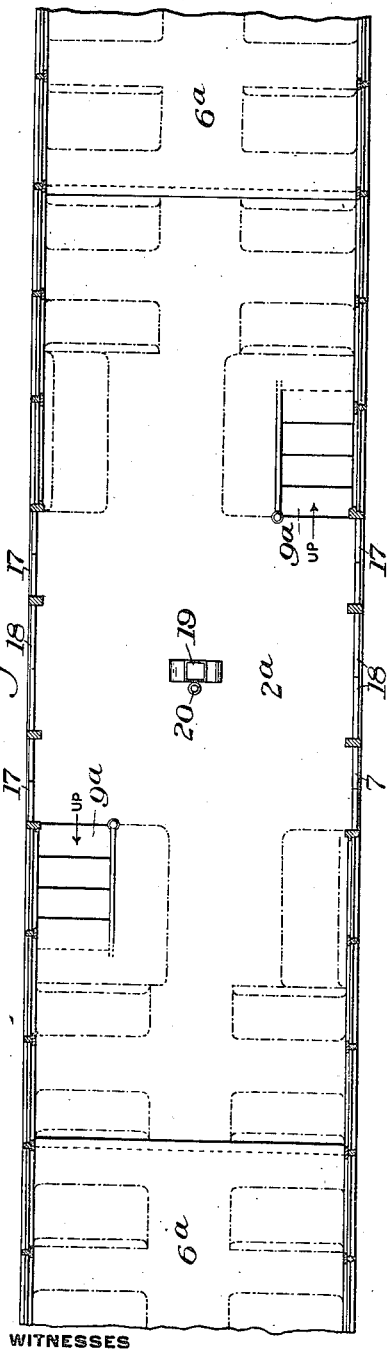
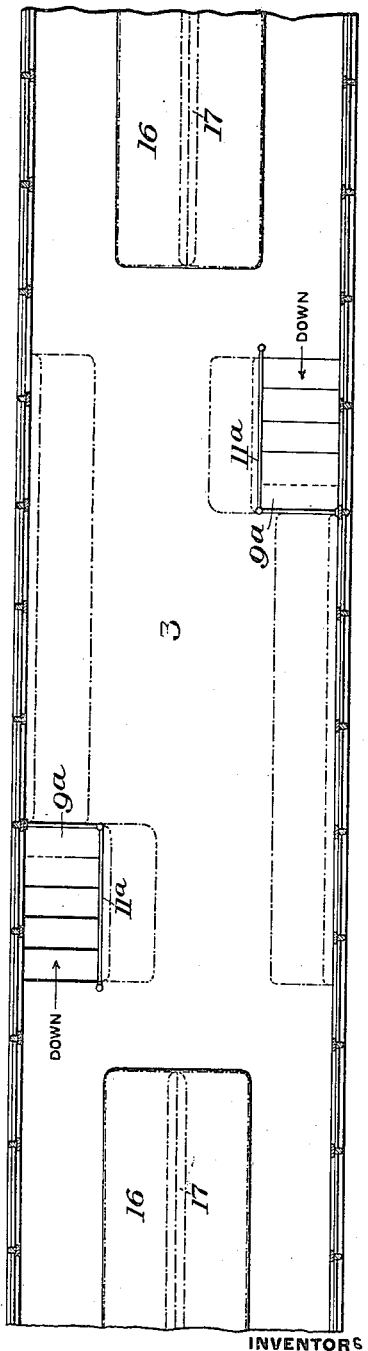

P. N. JONES, F. R. PHILLIPS & J. W. WELSH.
PASSENGER CAR.
APPLICATION FILED JULY 8, 1912.
1,150,680.
Patented Aug. 17, 1915.
4 SHEETS—SHEET 4.
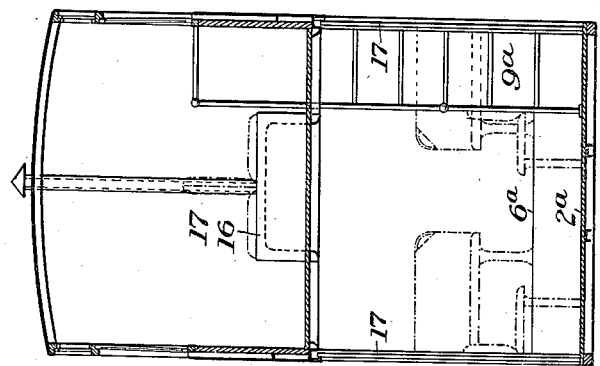
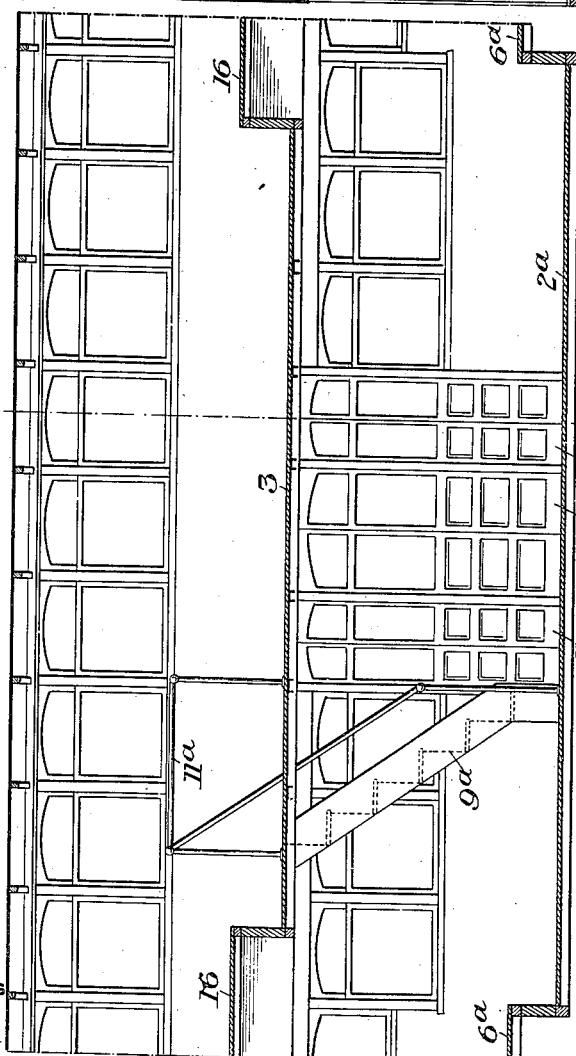

UNITED STATES PATENT OFFICE.

PEARL N. JONES, FRANK R. PHILLIPS, AND JAMES W. WELSH, OF PITTSBURGH, PENNSYLVANIA.

PASSENGER-CAR.

1,150,680.　　　　　Specification of Letters Patent.　　Patented Aug. 17, 1915.

Application filed July 8, 1912. Serial No. 708,258.

*To all whom it may concern:*

Be it known that we, PEARL N. JONES, FRANK R. PHILLIPS, and JAMES W. WELSH, all residents of Pittsburgh, in the county of Allegheny and State of Pennsylvania, have invented a new and useful Improvement in Passenger-Cars, of which the following is a full, clear, and exact description, reference being had to the accompanying drawings, made part of this specification, in which—

Figure 1 is a side elevation partly in longitudinal section showing our invention as applied to a double-deck car; Fig. 2 is a plan view of the upper deck; Fig. 3 is a cross section on the line III—III of Fig. 1; Fig. 4 is a partial plan view of the lower deck; Fig. 5 is a lower deck partial plan view showing a modification of the invention; Fig. 6 is a partial plan view of the upper deck of the form of Fig. 5, and Fig. 7 is a longitudinal section; Fig. 8 is a cross section on the line VIII—VIII of Fig. 7 of the modified form; and Fig. 9 is a broken side elevation showing an end portion of the modified form including the small wheels.

Our invention relates to passenger cars, particularly those used on street railway or interurban lines.

The object of the invention is, first, to provide a side-entrance car with the floor close to the ground, and, second, to afford a double-deck car without giving it undue height above the pavement.

The invention is also designed to combine these features and provide a double-deck car having a side-entrance.

In accordance with our invention, the main body of the car floor may be only one step above the rail level, thus rendering the car easy of access.

The invention also relates to other details and combinations of parts as hereinafter more fully described and claimed.

In the drawings, referring to the form of Figs. 1 to 4, inclusive, 2 represents the lower floor or deck and 3 the upper floor or deck. The lower floor is suspended between the trucks sufficiently close to the ground to avoid the necessity for a step. In other words, the floor is at a one-step height above the ground, the entering passenger stepping on the floor itself as he enters. The side-entrance doors 4, 4 are in the center of the drop floor portion, there being preferably two doors at each side with a dividing post 5 between them, the doors being either one-leaf or two-leaf and either sliding or swinging doors, or combined sliding and swinging doors. These doors may be operated from any convenient point by either the motorman or the conductor. The doors are preferably the same at each side if the car is a double-end car, or one set of doors may be omitted if the car is intended to run in one direction only. The end portions 6 of the lower deck above the trucks are shown in this form as elevated to such a distance above the pavement that only the floor portion 2 between the trucks is available for seating space. In this case wheels of ordinary size may be used on the trucks, as well as trucks of ordinary construction. The end space between the deck 6 and the upper deck 3 may be utilized in this case for the contactor box 7, the resistance indicated at 8, and other electrical or air brake equipment. In the form shown the upper deck is reached by the end stairways 9, 9, which are preferably slightly at one side of the longitudinal axis of the car. The well of the stairway may have a vertical wall indicated at 10. The upper deck is preferably provided with rails 11 around the stairway wells, the seating space of this deck extending between the end cabs 12 for the motorman. These cabs may be reached by ladder steps 13, one of which is shown in Fig. 1, suitable doorways being provided at the sides of the cabs. The seats for both the upper and lower deck may be arranged in any desirable manner. Fig. 2 shows one arrangement of seats for the upper deck; and for the lower deck, side seats 14 are preferably employed, a removable seat 15 being used along the central side-entrance doors on the unused side.

In forming the side framing of the car, the lower sill is preferably bent down between the trucks and extends under the lower deck or floor; and the sheath or deck plates along the upper deck are made strong enough to carry the compression strains. In this form shown in Figs. 5 to 9, inclusive, the lower deck is at two different levels, one marked 2ª, and the other marked 6ª; the latter being over the trucks or wheels. In order to provide proper head room for passengers entering the slightly raised portion 6ª of the lower deck, we preferably raise similar central portions 16 of the upper deck as shown in Figs. 6, 7 and 8. These raised portions may be used as seats, a back 17 being preferably employed along the longitudinal center thereof. In this case we have shown three sets of doors at the sides, 18 preferably being the entrance doors and 17 the exit doors. 19 represents the central fare box, and 20 a post arranged to carry suitable connections by which the doors are controlled and operated. In this form, 9ª represents the stairways leading to the upper deck, these being arranged in this form along the opposite sides of the car. The seats may be arranged in any desirable way, and we have shown one arrangement of seats for the lower deck in Fig. 5. Fig. 6 shows on dotted lines an arrangement of seats on the upper deck in addition to the raised seating portions to give head room, of the end portions of the lower deck.

The advantages of our invention result from the obtaining of a double-deck car which is not lifted too far above the pavement, and also from providing a stepless, side-entrance car. Another advantage results from a combination of these features where desired, while both are obtained by central and strong construction. In either form of the invention, the upper portion of the side framing above the neutral axis should be strengthened above the doors, as in our co-pending application.

We claim:

1. A double-decked car, having the central portion of its lower floor dropped between the trucks to within one step from the rail level, the car having a side door-way giving direct access to the dropped portion, and straight stairways leading from the level of said dropped portion to the upper deck; substantially as described.

2. A double-decked car, having the central portion of its lower floor dropped between the trucks to within one step from the rail level, the car having a side door-way giving direct access to the dropped portion, and a straight stairway leading from each end of said dropped portion and from the level thereof to the upper deck; substantially as described.

3. A double-decked car, having the central portion of its lower deck dropped between the trucks to a level such that access can be had thereto by one step up from the street level, a stairway leading from said dropped portion to the upper deck and the car having a side doorway giving direct access to and from said dropped portion to the upper deck said stairway running longitudinally of the deck said dropped portion having a space for a conductor's stand adjacent to the doorway and to the stairs; substantially as described.

4. A double-decked car having the central portion of the lower floor dropped between the car trucks, the car having a side doorway giving entrance to said dropped portion, and straight stairways running longitudinally of the car and leading from the dropped portion to the upper deck, substantially as described.

5. A double-decked car having the central portion of the lower floor dropped between the car trucks, the car having a side doorway giving entrance to said dropped portion, and stairways running longitudinally of the car and leading from the dropped portion to the upper deck, said stairways being arranged one at each side of the said doorway and starting between said doorway and the trucks, substantially as described.

In testimony whereof, we have hereunto set our hands.

PEARL N. JONES.
FRANK R. PHILLIPS.
JAMES W. WELSH.

Witnesses:
  GUY C. HECKER,
  F. R. COGSWELL.